(12) United States Patent
Billinghurst et al.

(10) Patent No.: US 7,343,278 B2
(45) Date of Patent: Mar. 11, 2008

(54) TRACKING A SURFACE IN A 3-DIMENSIONAL SCENE USING NATURAL VISUAL FEATURES OF THE SURFACE

(75) Inventors: Mark N. Billinghurst, Christchurch (NZ); Hirokazu Kato, Osaka (JP)

(73) Assignee: ARToolWorks, Inc., Seattle, WA (US)

( * ) Notice: Subject to any disclaimer, the term of this patent is extended or adjusted under 35 U.S.C. 154(b) by 563 days.

(21) Appl. No.: 10/692,020

(22) Filed: Oct. 22, 2003

(65) Prior Publication Data

US 2004/0136567 A1 Jul. 15, 2004

Related U.S. Application Data

(60) Provisional application No. 60/513,725, filed on Oct. 22, 2003, provisional application No. 60/420,638, filed on Oct. 22, 2002.

(51) Int. Cl.
    *G06F 9/455* (2006.01)
(52) U.S. Cl. .................. 703/23; 348/162; 348/180; 345/420; 345/700; 345/426; 382/103; 382/154; 382/275
(58) Field of Classification Search .............. 703/23; 345/162, 420, 700, 426; 348/180; 382/103, 382/154, 275; 250/208.1; 356/72
    See application file for complete search history.

(56) References Cited

U.S. PATENT DOCUMENTS 5,850,352 A    12/1998  Moezzi
6,084,590 A     7/2000  Robotham
6,160,907 A    12/2000  Robotham
6,618,076 B1 *  9/2003  Sukthankar et al. ........ 348/180
6,914,599 B1 *  7/2005  Rowe et al. ................ 345/420
2002/0024675 A1 2/2002  Foxlin
2002/0039111 A1* 4/2002  Gips et al. .................. 345/700
2002/0105484 A1 8/2002  Navab (Continued)

OTHER PUBLICATIONS

Izquierdo et al., "Modeling arbitrary objects based on geometric surface conformity", IEEE, 1999.*

(Continued)

*Primary Examiner*—Paul Rodriguez
*Assistant Examiner*—Kandasamy Thangavelu
(74) *Attorney, Agent, or Firm*—Perkins Coie LLP

(57) ABSTRACT

A facility for determining the 3-dimensional location and orientation of a subject surface in a distinguished perspective image of the subject surface is described. The subject surface has innate visual features, a subset of which are selected. The facility uses the location of the selected visual features in a perspective image of the subject surface that precedes the distinguished perspective image in time to identify search zones in the distinguished perspective image. The facility searches the identified search zones for the selected visual features to determine the 2-dimensional locations at which the selected visual features occur. Based on the determined 2-dimensional locations, the facility determines the 3-dimensional location and orientation of the subject surface in the distinguished perspective image.

24 Claims, 15 Drawing Sheets
(11 of 15 Drawing Sheet(s) Filed in Color)

U.S. PATENT DOCUMENTS

| | | | |
|---|---|---|---|
| 2002/0113756 A1 | 8/2002 | Tuceryan | |
| 2002/0172413 A1* | 11/2002 | Chen | 382/154 |
| 2003/0011596 A1* | 1/2003 | Zhang et al. | 345/426 |
| 2003/0012408 A1* | 1/2003 | Bouguet et al. | 382/103 |
| 2003/0012425 A1* | 1/2003 | Suzuki et al. | 382/154 |
| 2003/0035098 A1* | 2/2003 | Ishiyama | 356/72 |
| 2003/0071194 A1* | 4/2003 | Mueller et al. | 250/208.1 |
| 2003/0076980 A1* | 4/2003 | Zhang et al. | 382/103 |
| 2003/0095186 A1* | 5/2003 | Aman et al. | 348/162 |
| 2004/0028258 A1* | 2/2004 | Naimark et al. | 382/103 |
| 2004/0240750 A1* | 12/2004 | Chauville et al. | 382/275 |

OTHER PUBLICATIONS

Lin, C., "Invariants of three-dimensional contours", IEEE, 1988.*

Kobbelt et al., "feature sensitive surface extraction from volume data", ACM, 2001.*

Blanz et al., "A morphable model for the synthesis of 3D faces", ACM 1999.*

Azuma, R., "A Survey of Augmented Reality", Presence: Teleoperators and Virtual Environments, 1997, vol. 6, No. 4, pp. 355-385.

Azuma, R. et al., "Recent Advances in Augmented Reality", IEEE Computer Graphics and Applications, 2001, vol. 21, No. 6, pp. 34-47.

Ferrari, V. et al., "Markerless Augmented Reality with a Real-time Affine Region Tracker", Proc. of 2nd Int. Symp. on Augmented Reality, 2001, pp. 87-96.

Kanbara, M. et al., "A Stereo Vision-based Mixed Reality System with Natural Feature Point Tracking", The Second International Symposium on Mixed Reality, Mar. 2001, pp. 56-63, Yokohama, Japan.

Kawashima, T. et al., "Magic Paddie: A Tangible Augmented Reality Interface for Object Manipulation", Proc. of 2nd Int Symp. on Mixed Reality, 2001, pp. 194-195.

Klinker, G. et al., "Augmented Reality: A Balancing Act Between High Quality and Real-Time Constraints", Mixed Reality, 1999, pp. 325-346.

Rekimoto, J., "Matrix: A Realtime Object Identification and Registration Method for Augmented Reality", Proc. APCHI'98, 1998, pp. 1-6.

State, A. et al., "Superior Augmented Reality Registration by Integrating Landmark Tracking and Magnetic Tracking", Proc. SIGGRAPH 96, 1996, pp. 429-438.

Uenohara, M. et al., "Vision-Based Object Registration for Real-Time Image Overlay", Proc. CVRMed'95, 1995, pp. 13-22.

Yokokohji, Y. et al., "Accurate Image Overlay on See-Through Head-Mounted Displays Using Vision and Accelerometers", Proc. IEEE VR2000, 2000, pp. 247-254.

* cited by examiner

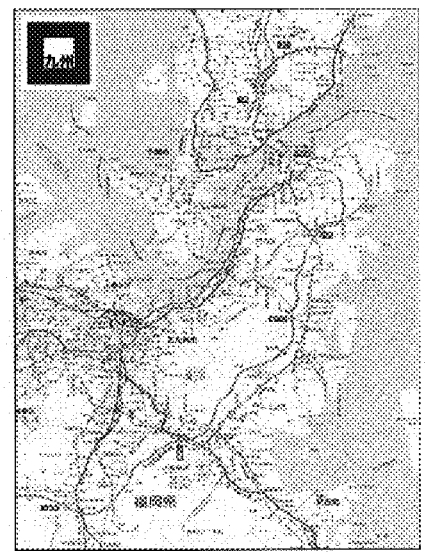
*FIG. 12A*     *FIG. 12B*

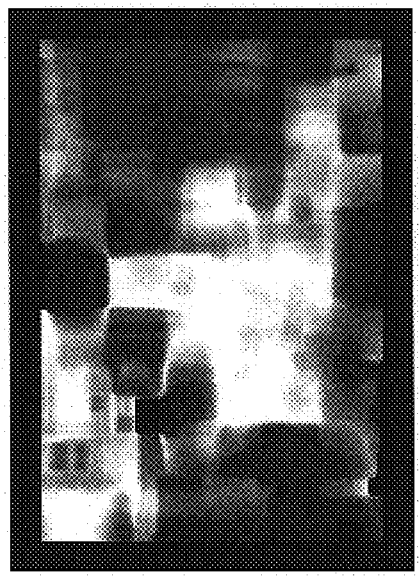 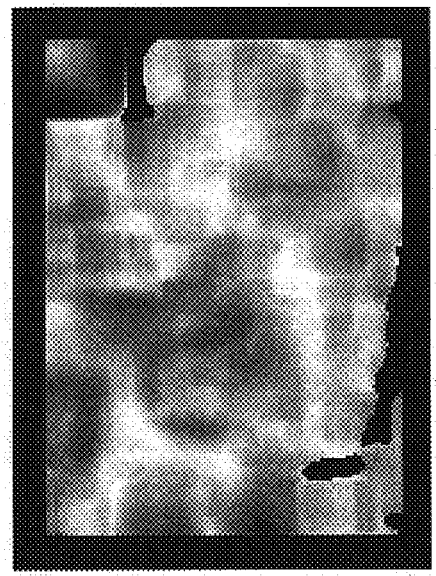
*FIG. 14A*        *FIG. 14B*

 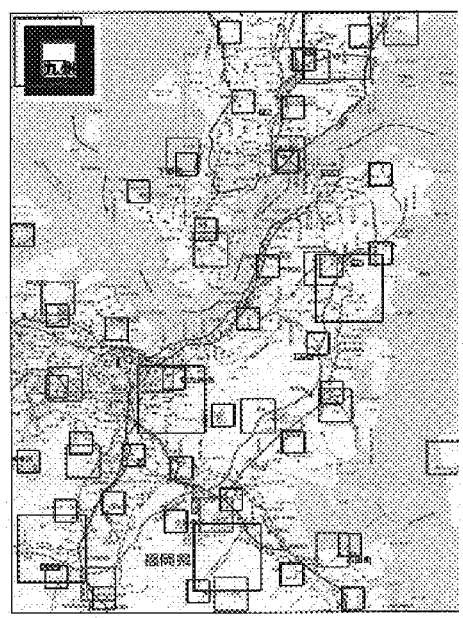
*FIG. 15A*  *FIG. 15B*

TRACKING A SURFACE IN A 3-DIMENSIONAL SCENE USING NATURAL VISUAL FEATURES OF THE SURFACE

CROSS-REFERENCE TO RELATED APPLICATION

This application claims the benefit of (1) U.S. Provisional Application No. 60/420,638, entitled "An Augmented Reality Registration Method Based On Matching Templates Generated From An Image Texture," filed on Oct. 22, 2002; and (2) U.S. Provisional Application No. 60/513,725 (patent counsel's matter No. 37181-8002-US00), entitled "Registrating a Specific Planar Scene Using Fiducial Markers," filed contemporaneously herewith, each of which is hereby incorporated by reference in its entirety.

TECHNICAL FIELD

The present invention is directed to the fields of computer vision and video processing.

BACKGROUND

One task faced in the field of computer vision is tracking the movement of an object within a video scene. In many cases, tracking the object consists of tracking the location and orientation of the object with respect to a camera—that is, the point in space that is the perspective from which the video scene is captured.

One significant subset of the movement tracking task is tracking the movement of a roughly planar, i.e., 2-dimensional, surface within a video scene. Such a surface may be one side of a sheet of paper, either a free-standing sheet of paper or a sheet of paper in a book. It may also be a surface presented by virtually any other object. One application of surface tracking is introducing a view of a virtual, 3-dimension object into each frame of the video scene that appears to float about the surface, termed reality augmentation.

Surface tracking has conventionally been addressed through the use of fiducial marker tracking. Fiducial marker tracking involves affixing a special, visually distinct symbol (such as a bold black square having a white interior) to the surface to be tracked; locating the symbol—called a fiducial marker—in each video frame; determining the location of the surface with respect to the camera based on the size of the marker in the video frame and its location in the video frame; and determining the orientation of the surface with respect to the camera based on the orientation of the marker in the video frame.

Fiducial marker tracking has significant disadvantages, however. First, fiducial marker tracking fails any time the fiducial marker is not present in the scene. This can happen in a variety of circumstances, even while the surface remains in the scene. For example, the fiducial marker may be occluded by an object that intervenes in space between the camera and the fiducial marker, such as a person's hand or another inanimate object. The fiducial marker may also move outside of the boundaries of the video scene, such as when the camera moves so close to (or zooms in so close to) the surface that the scene can only contain a portion of the surface that excludes the fiducial marker. This disadvantage can only be overcome by adding larger and larger numbers of fiducial markers to the surface, overwhelming the appearance of the surface and obscuring its innate visual features.

Second, fiducial marker tracking can fail when the surface is distant from the camera, and the camera's view of the surface is too limited to distinguish the fiducial marker. The only way to address this disadvantage is to use larger and larger fiducial markers, again overwhelming the appearance of the surface and obscuring its innate visual features.

In view of these shortcomings, an approach to surface tracking that does not rely on the continuous visibility and distinguishability of fiducial markers affixed to the surface would have significant utility.

BRIEF DESCRIPTION OF THE DRAWINGS

The patent or application file contains at least one drawing executed in color. Copies of this patent or patent application publication with color drawings will be provided by the U.S. Patent and Trademark Office upon request and payment of the necessary fee.

FIGS. 12A and 12B are image diagrams showing sample images tracked by the facility.

FIGS. 14A and 14B are diagrams showing preliminary feature point extraction results.

FIGS. 15A and 15B are diagrams showing preliminary feature point extraction results.

DETAILED DESCRIPTION

A software facility for tracking a surface in a 3-dimensional scene using natural visual features of the surface ("the facility") is provided. In some embodiments, the facility acquires an image of the surface, and uses it to select visual features of the surface that the facility will use to track the surface. In some embodiments, the facility performs this surface analysis and feature selection on a non-real-time basis. In some embodiments, the facility selects groups of features that are each of a different size, for use when the surface is at different distances from the camera. To initially identify the surface in the video frame, in some embodiments, the facility locates a fiducial marker attached to the surface within the video scene, and uses it to determine the surface's distance and orientation relative to the camera. After this point, the facility reiteratively uses earlier tracking results to both (1) select a group of features to search for based upon the distance of the surface from the camera, and (2) delineate search zones in the video scene in which the facility expects to find the natural features based upon their prior positions. The facility then searches these search zones for the natural features in the selected group, and uses their locations in the video scene to determine the surface's location and orientation relative to the camera.

The key idea to allow real-time tracking of natural features is to select beforehand the "best" features to track using an off line image processing program, and to choose an appropriate and fast matching method that will allow the detection and matching of these features in real-time during the online tracking phase. Based on these considerations, we chose points as the features to track, and template matching as the matching technique.

Figure 1:
FIG. 1 is an image diagram showing a typical image that, when attached to a surface, can be tracked by the facility.

FIG. 1 is an image diagram showing a typical image that, when attached to a surface, can be tracked by the facility. The image has visual contents 100, including a fiducial marker 110.

The off line extraction of the features to track greatly reduces the computation time and makes it possible to track the features in real-time: since the set of specific pixels to track is defined a priori, natural point features do not have to be extracted from each frame, but only to be tracked over time. In other words, the off line feature point extraction generates a set of fixed "natural corners" which perform exactly the same function as the artificial corners introduced by a marker, i.e. to be reference points whose coordinates are known in the object frame. However, as the camera pans in or pans out, the level of detail perceived by the camera changes dramatically. For example, a black letter on a white background is a good feature to track when the camera is close to the planar scene, it might be that this same letter is not visible when the camera is far away from the scene. This problem can be solved by performing the off line feature extraction independently at different resolutions and adapting the set of features online as the camera moves.

In all other respects, the general principle of natural-feature based tracking is the same as the marker-based tracking. Four coplanar feature points whose coordinates are known in the page and their projections in the image plane provide correspondences that allow calculating the planar homography and the extrinsic parameters. The main difference is that there are usually a lot more than four feature points available, thus providing a natural mechanism to cope with occlusions: if the tracked planar scene has a reasonable size, it is very unlikely that the user's hand will occlude all the available features in the image.

One drawback of the natural feature tracking however is that the tracker's initialization appears to be a delicate task: detecting four natural feature points in the first video frame requires template matching on the whole image for every single possible feature point. This search is computationally expensive and ineffective if the video frame does not provide a perpendicular view of the scene to track. To overcome this drawback, a marker is placed on the page to provide the initial homography as described further below. This homography is used to unwarp the image so that the tracker has a perpendicular view of the scene. From there the tracker knows where to look for the predefined natural point features and no longer needs the marker to be in view. A search size is fixed and template matching is carried out in windows around the predicted feature points' positions. The four "best" natural point features detected are selected as input for updating the nomography. The updated nomography is also used to generate new templates around the feature points, since the region around a pixel changes as the camera moves. The previous feature points' locations and displacement are used to predict their location in the next frame. Then the tracker estimates the current resolution of the planar scene as seen by the camera and changes the set of predefined features to track if appropriate. Finally, the camera pose is estimated and the virtual model can be rendered on the top of the book page.

Figure 2:
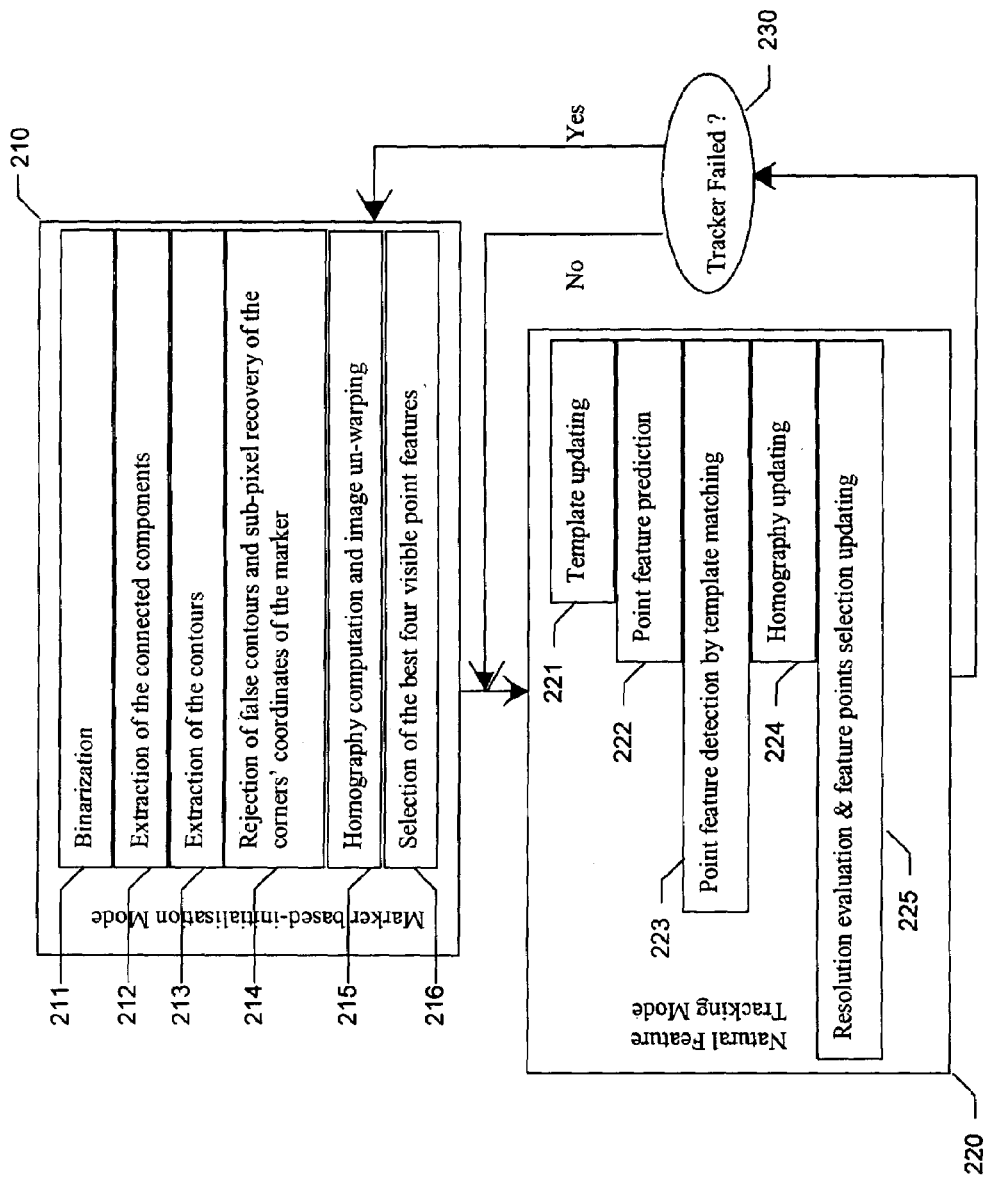
FIG. 2 is a flow diagram showing steps typically performed by the facility in order to track a surface.

FIG. 2 is a flow diagram showing steps typically performed by the facility in order to track a surface. The facility begins in marker based initialization mode 210. In step 211, the facility converts an image of the surface into binary form. In step 212, the facility extracts connected components from the binary version of the image of the surface. In step 213, the facility extracts the contours from the image of the surface. In step 214, the facility rejects any false contours among the extracted contours, and performs sub-pixel recovery of the coordinates of the corners of the marker. In step 215, the facility computes the homography of the surface (that is, its location and orientation relative to the camera), and un-warps the image of the surface by normalizing it with respect to the surface's determined location and orientation with respect to the camera. In step 216, the facility selects the best visual features of the surface, such as the best four features. These selected features are sometimes referred to as "point features."

After the steps of the marker-based initialization mode 210 are completed, the facility enters a natural feature tracking mode 220. In step 221, the facility updates the templates established during the marker-based initialization phase. In step 222, the facility uses earlier tracking results to predict the locations in the video image at which the surface's point features will occur in the next video frame. In step 223, the facility attempts to detect the point features near the predicted locations in the video frame using a template-matching process. In step 224, the facility updates the surface's nomography using the results of step 223. In step 225, the facility evaluates the resolution in feature point selection for the next iteration of the natural feature tracking mode. In some embodiments, step 225 precedes step 221 in the natural feature tracking mode (not shown).

After completing the steps of natural feature tracking mode 220, the facility performs a test 230 to determine whether the most recent iteration of the natural feature tracking mode failed to track the surface in the video scene. If so, the facility continues in the marker-based initialization mode to re-locate the surface in the video scene, else the facility continues in the natural feature tracking mode to continue tracking the surface.

Figure 3:
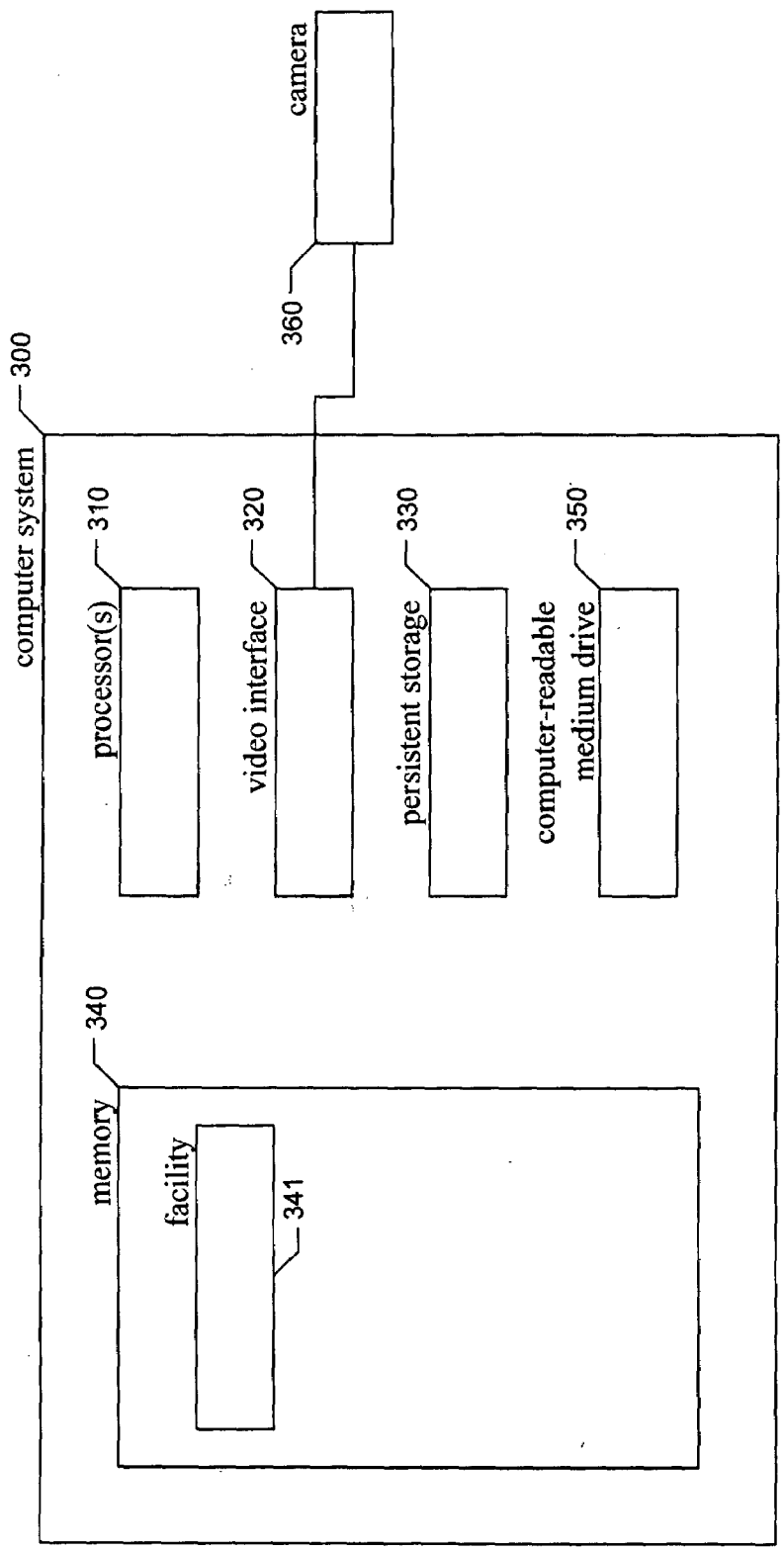
FIG. 3 is a block diagram showing a typical environment in which the facility operates.

FIG. 3 is a block diagram showing a typical environment in which the facility operates. The environment contains a computer system 300, which includes one or more processors 310 for executing programs, such as the facility; a video interface 320 that is connected to a camera 360 for acquiring individual images and/or video sequences comprised of images; a persistent storage device 330; a memory 340, containing at least the facility 341; and a computer-readable medium drive 350 for reading information or installing programs such as the facility from computer-readable media, such as a floppy disk, a CD-ROM, or a DVD. Those skilled in the art will appreciate that data and/or programs may be transferred between memory and the persistent storage device for purposes of memory management and data integrity. While various embodiments are described in terms of the environment described above, those skilled in the art will appreciate that the facility may be implemented in a variety of other environments including combinations of one or more computer systems or similar devices connected in various ways.

1. Off line Feature Extraction

This subsection illustrates the design of the feature extraction scheme that detects the best candidate points for template matching at different resolutions.

1.1 Template Matching

The off line feature extraction method detects points for which template matching will work well. Therefore, the design of the feature extraction scheme is contingent on the design of the template matching technique. Assuming that the disparity between two successive video frames $I_k$ and $I_{k+1}$ is small, then the criterion that can be used to match a point feature is similarity. For points, the universal measure of intensity similarity is correlation. Let $p_i$ be a feature point in $I_k$, and W be a window of size w+1 and h+1 (with w and h odd numbers) centered on $p_i$. W defines the template to look for in $I_{k+1}$.

Figure 4:
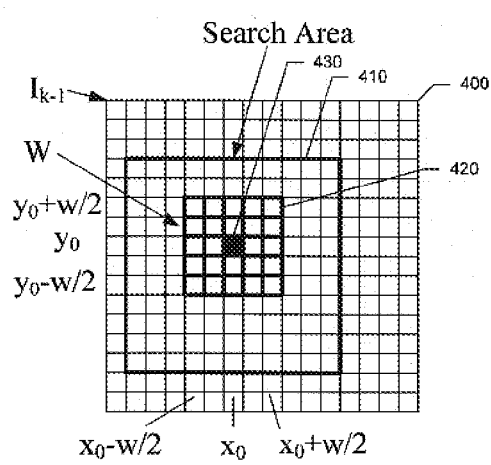
FIG. 4 is a pixel diagram showing the relationship between a window used in template matching and a search area within a video frame that contains it.

FIG. 4 is a pixel diagram showing the relationship between a window used in template matching and a search area within a video frame that contains it. Rectangle 400 is the video frame $I_{k+1}$. Rectangle 410 is the search area. Rectangle 420 is the search window W, centered on pixel 430 at $(y_0, x_0)$. Window W spans columns $x_0-w/2$ through $x_0+w/2$, and spans rows $y_0-w/2$ through $y_0+w/2$.

Finding the pixel in $I_{k+1}$ that is most likely to correspond to $p_i$ is equivalent to finding the region of size w+1 and h+1 in $I_{k+1}$ that has the highest correlation score with W within the search area. Normalized cross-correlation (NCC)—discussed in F. Vial, "State of the Art Report on Natural Feature Tracking for Vision-Based Real-Time Augmented Reality", Technical Report, Human Interface Technology Laboratory New Zealand (HITLab NZ), University of Canterbury, Christchurch, New Zealand, 2003, has shown to be an effective point correlation method. To calculate the NCC between a template W and a region of the same size around a pixel $(x_0, y_0)$ in $I_{k+1}$, the intensity values for the considered pixels have to be centered. Let i and j be indexes spanning a square region of the same size as W Then $$\tilde{I}_{k+1}(x_0, y_0, i, j) = I_{k+1}(x_0+i, y_0+j) - \overline{I}_{k+1}(x_0, y_0) \text{ and}$$
$$\tilde{W}(i, j) = W(i, j) - \overline{W}$$

are the centered values of the pixel (i,j) within the considered region in $I_{k+1}$ and W respectively, with $$\overline{I}_{k+1}(x_0, y_0) = \frac{1}{(w+1)(h+1)} \sum_{i=-w/2}^{w/2} \sum_{j=-h/2}^{h/2} I_{k+1}(x_0+i, y_0+j)$$

and $$\overline{W} = \frac{1}{(w+1)(h+1)} \sum_{i=-w/2}^{w/2} \sum_{j=-h/2}^{h/2} W(i, j)$$

Then, the normalized cross correlation score between W and the region around $(x_0, y_0)$ yields:

$$NCC(I_{k+1}(x_0, y_0), W) = \tag{1.1.1}$$

-continued
$$\frac{\sum_{i=-w/2}^{w/2} \sum_{j=-h/2}^{h/2} \tilde{I}_{k+1}(x_0, y_0, i, j) \tilde{W}(i, j)}{\sqrt{\sum_{i=-w/2}^{w/2} \sum_{j=-h/2}^{h/2} \tilde{I}_{k+1}(x_0, y_0, i, j)^2} \sqrt{\sum_{i=-w/2}^{w/2} \sum_{j=-h/2}^{h/2} \tilde{W}(i, j)^2}}$$

An advantage is that the NCC scores between −1 and 1, providing an intuitive range to perform similarity thresholding: a value of −1 indicates no similarity at all whereas a value of 1 shows perfect similarity. Another benefit of using the NCC comes from its insensitivity to illumination changes. If we model an illumination change by the addition of a constant value to all the pixels of the regions, then the score of the NCC will be the same as without that offset. However, correlation is not insensitive to any affine or perspective transformation. Therefore, templates will be generated for each frame grabbed by the system as mentioned above.

Moreover, NCC is computationally expensive and can become inefficient when the values of w, h and the size of the search area become large. To compensate for this, a coarse to fine technique will be used: firstly, template matching within the search window is carried out every n pixels to reduce the search complexity by a factor n. The three positions for which the NCC score was the highest are stored. Then the fine search is carried out: template matching is performed for every pixel in the regions around the three stored positions. The highest NCC score provides the final detected position.

1.2 Point Feature Extraction Scheme

A front-facing representation of the planar scene to track containing a marker has to be supplied to the tracker. Usually, a JPEG or a GIF file is used as the input image file. Firstly, the marker is detected in the input image using well known techniques, such as those described in U.S. Provisional Patent Application No. 60/513,725. The position and size of the scene in the input image are calculated and stored in a file.

Subsequently, the extraction of the natural features of the scene is performed. The choice of a specific template matching technique to match natural feature points from frame to frame requires that we define a set of constraints for the feature points to be extracted from the original image:

Constraint 1: the similarity between pixels inside the w×h region around the candidate feature point (and outside the circular area defined in constraint 2.) should be small so that uniform or low contrast regions are rejected. This is equivalent to saying that the template should have a minimum variance.

Constraint 2: the similarity between pixels inside the w×h region within a circular region of radius n around a candidate feature point should be high so that the best three results in the coarse step of template matching include the region around the correct position of the feature. In other words, this constraint ensures that the correct feature position is not missed by the coarse step of the template matching.

Constraint 3: there should be no similar region within the search area around a candidate feature point for which template matching is carried out. In other words, we want to make sure that there can be no more than one match for a template of size w and h in the search area of size $w_{search}$ and $h_{search}$ around the candidate pixel so that the tracker does not get confused.

Figure 5:
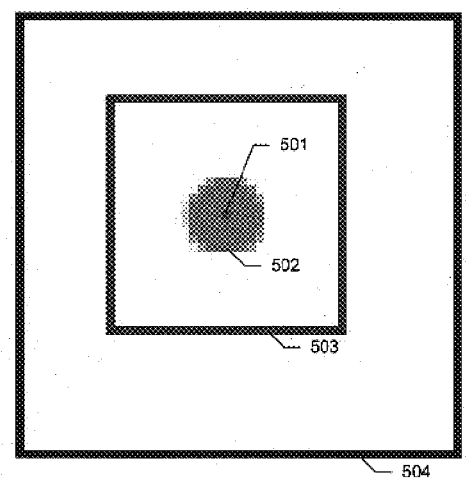
FIG. 5 is a pixel diagram that illustrates the feature point constraints for a candidate pixel.

FIG. 5 is a pixel diagram that illustrates the feature point constraints for a candidate pixel. The candidate pixel 501 is likely to be a good feature within template 503 if: (1) the similarity within a small circular region 502 about the candidate pixel is high; (2) the similarity inside the template 503 and outside the circular region 502 is low, i.e., there is a high variance; and (3) no similar template regions exist within search area 504.

The off line feature extraction program proceeds thus: the user gives in the different resolutions for which he or she would like the features to be automatically extracted. The more resolutions are specified, the more accurate the tracker will be but the more processing time will be required. The parameters that have to be fixed for the natural feature extraction are:

the template dimensions w and h
the threshold $t_{var}$ defining the minimum value of the variance described in constraint 1 above.
the search size for template matching $w_{search}$ and $h_{search}$
the threshold $t_{MaxSim}$ defining the maximum tolerated similarity described in constraint 3.
the radius r of the small circular region and the threshold $t_{MinSim}$ defining the minimum tolerated similarity described in constraint 2.

Experimental results have been carried out (see Section 3 below) that provide default values for these parameters. In a first step, the feature extraction process only tests for the constraints 1 and 3. The procedure is outlined in the pseudocode shown in Code Block 1 below.

For every resolution chosen by the user
For every pixel pix in the input image
Generate the template tp of size w and h around pix.
Calculate the variance over the region tp excluding the central circular area of radius n.
If (variance<$t_{var}$) reject pix and go to next pixel.
For every w×h region reg included in the $w_{search}$×$h_{search}$ window around pix
→ Calculate the similarity sim between reg and tp with the normalized cross correlation.
→ Update the maximum value of similarity within the search area.
→ If (similarity>$t_{MaxSim}$) reject pix and go to next pixel.
End For
Pix=sim
End For
End For Code Block 1

Figure 6A:
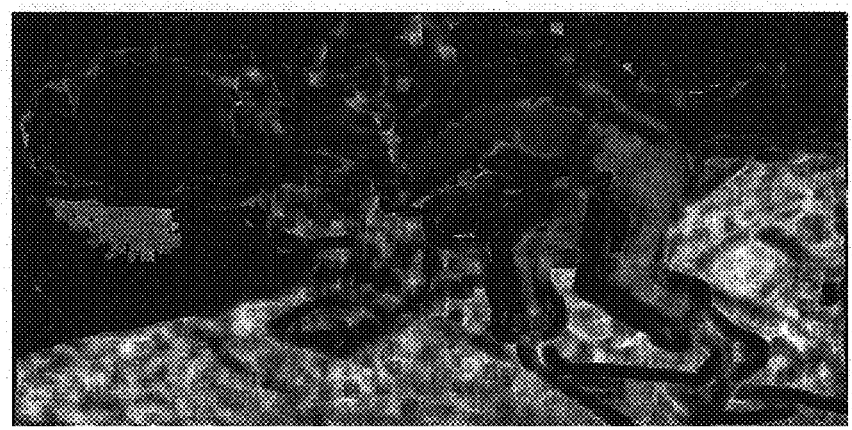
FIG. 6A shows the output of this first step of the off line feature extraction algorithm for the original image resolution of 200 dpi.
Figure 6B:
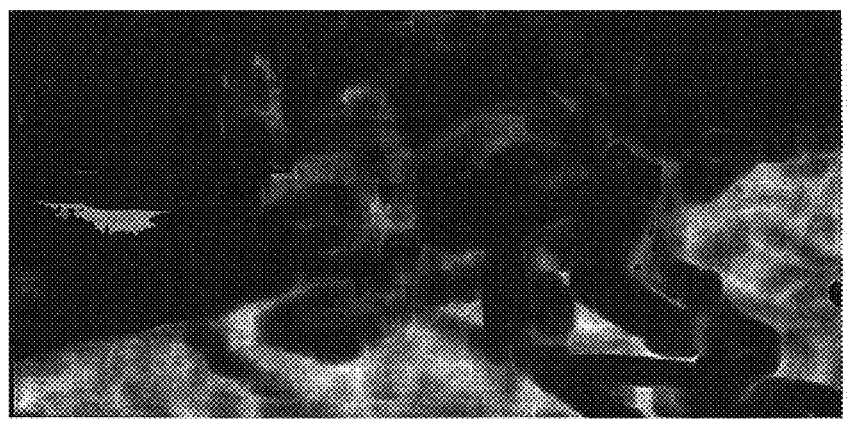
FIG. 6B shows the output at a lower resolution of 100 dpi. Both of these figures reflect a template size of 25×25 pixels.

The result of this algorithm performed for the image in FIG. 1 at two different resolutions is shown in FIGS. 6A and 6B. FIG. 6A shows the output of this first step of the off line feature extraction algorithm for the original image resolution of 200 dpi. FIG. 6B shows the output at a lower resolution of 100 dpi. Both of these figures reflect a template size of 25×25 pixels. In the output images, dark regions indicate highly correlated regions (uniform regions) from which feature points should not be chosen. On the contrary bright regions are image regions for which template matching is likely to work well. As expected, fewer details are visible in the image with lower resolution.

Figure 7:
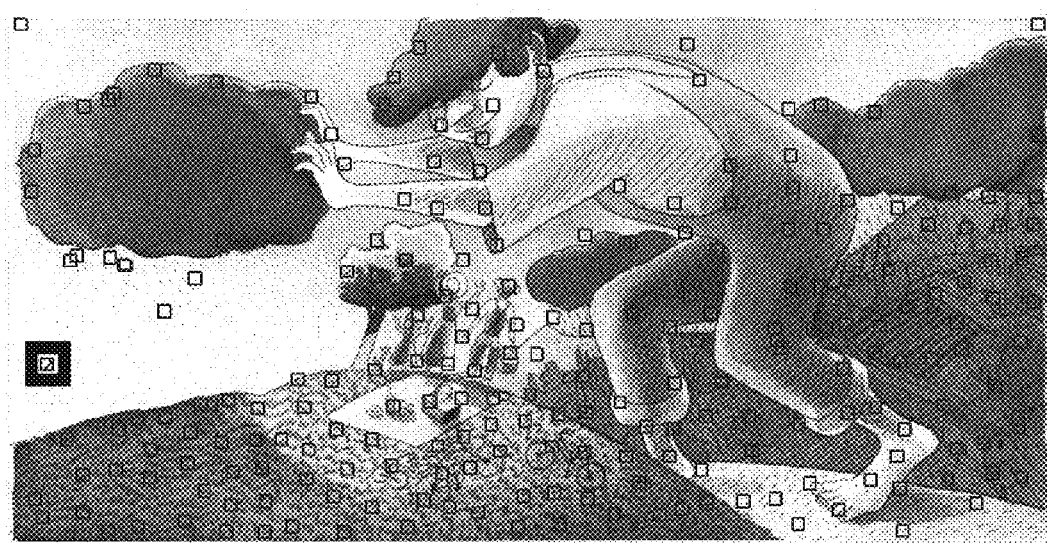
FIG. 7 is an image diagram showing sample features extracted from the image shown in FIG. 1.

The obtained maps of candidate features at different resolutions are used as input for a second algorithm that selects the best point features to track. This operation is performed by enforcing constraint 2 and by thresholding the results obtained. Additional restrictions are that the selected template regions must be as evenly distributed as possible and must not overlap. The $t_{var}$ parameter directly influences the number of features extracted: the higher $t_{var}$ is the fewer feature points will fulfil constraint 1. FIG. 7 is an image diagram showing sample features extracted from the image shown in FIG. 1. FIG. 7 shows the extracted features in the original image for $t_{var}$=10. Each red square identifies a feature extracted for the original resolution (200 dpi) with $t_{var}$=10, $t_{MaxSim}$=0.65 and $t_{MinSim}$=0.85. Having a large number of extracted features allows the tracker to cope better with occlusions but slows down the tracking process and may confuse the tracker under some occlusive conditions.

On the other hand, few features speeds up the tracking process but leads the system to be much more sensitive to occlusions. As a consequence, a trade-off has to be made to find the optimal balance between a good occlusion handling and a fast tracking. The locations of the extracted feature points relatively to the marker are stored in a file that will be used during the online tracking mode.

2. Online Tracking

This subsection describes an efficient tracking algorithm of predefined features which allows continued pattern tracking in the presence of significant occlusion. The fundamental idea is to track the known point feature from frame to frame, and to update the homography for the planar scene based on these natural features, instead of simply relying on the four artificial corners provided by the marker.

2.1 Initialization

As mentioned earlier, the initialization of the tracker is made using the fiducial marker as described in Section 1.2.

2.2 Feature Selection and Template Updating

Now that the initial homography has been computed, the tracker has to decide which natural features are the "best" ones to choose in the current frame. Keeping in mind the fact that our application must run in real-time, we want to choose as few features as possible whose locations are optimal. Therefore, the following heuristic selection method is chosen:

1. Using the homography of the previous frame, obtain the image coordinates of the features from their known coordinates in the object frame. Using the estimate of the current resolution, reject all features that are not visible in the current video frame.

2. Selection of the first feature point: select the one whose position is the furthest from the video frame center.

3. Selection of the second feature point: select the one that is the furthest from the first feature point.

4. Selection of the third feature point: select the one that maximizes the area of the triangle formed with the two first selected feature points.

5. Selection of the fourth feature point: select the point that maximizes the area of the rectangle formed with the three first selected feature points.

The motivation behind this selection scheme is that the homography computed from point features distant from each other is less prone to errors. Once these four points have been selected, the homography from previous frame is also used to generate new templates around the features. This template updating ensures that the rotated view of the template does not prevent the template matching technique from working.

2.3 Coarse Feature Prediction

The first stage of the tracking mode consists of predicting the location of the features in the current frame using the homography computed in the previous frame. Assuming temporal coherency, three simple prediction methods can be derived.

Firstly, it can be supposed that the feature in the current frame $I_k$ will be located at the same position as in the previous frame $I_{k-1}$ using the small inter-frame motion hypothesis:

$$\hat{p}_i^k = p_i^{k-1} \qquad (2.3.1)$$

with the superscript "^" designated an estimation.

As the camera image is almost always moving, this assumption is almost always violated, and we may therefore rather assume a constant velocity of the feature. So for any frame $I_k$ with k>2, the value of the velocity vector v yields:

$$v(k) = v = \frac{p_i^{k-1} - p_i^{k-2}}{\Delta t}$$

with $\Delta t$ the time elapsed between the frame $I_{k-1}$ and $I_{k-2}$. We will suppose that the time elapsed between two frames is constant and has a unit value. We can subsequently write $$v = p_i^{k-1} - p_i^{k-2}$$

$\hat{p}_i^k$ can then be estimated as:

$$\hat{p}_i^k = p_i^{k-1} + v$$

$$\hat{p}_i^k = 2p_i^{k-1} - p_i^{k-2} \qquad (2.3.2)$$

In a similar manner, if we consider that the acceleration of the feature is constant, then its position in frame $I_k$ can be estimated by:

$$\hat{p}_i^k = 3p_i^{k-1} - 3p_i^{k-2} + p_i^{k-3} \qquad (2.3.3)$$

Those position estimates are coarse and could not compete in accuracy with the widely used Kalman filtering discussed in G. Iannizzotto, L. Vita, "On-line Object Tracking for Colour Video Analysis," Real-Time Imaging, 8:2, pp. 145-155, April 2002, and D. Koller, G. Klinker, E. Rose, D. Breen, R. Whitaker, M. Tuceryan, "Real-time Vision-Based Camera Tracking for Augmented Reality Applications," in Proc. of the ACM Symposium on Virtual Reality Software and Technology, pp. 87-94, Lausanne, Switzerland, September 1997, each of which is hereby incorporated by reference in its entirety, but they have the great advantage of being computationally cheap. Following one, two or all three of these estimations, one can predict the position of $p_i$ in the current frame.

2.4 Feature Detection

The estimated positions of the features are subject to errors due to small errors in the homography as well as due to the approximations introduced in Section 4.4.2. A search window around that position has to be defined to proceed with template matching. The tricky task is to fix the size of this search area. A simple approach is to declare its size constant, and to set it to a value determined empirically by tests in real conditions. This approach is very simple and may not be well adapted to dynamic motions, yet it is the basis of our system since we extracted features assuming a fixed search window size. A large search window allows for more movement, but slows down the matching process since normalized cross correlation has to be carried out for a large number of pixels. Conversely, a small search window size increases the speed of the matching process, but increases the chance of tracker failure due to rapid motion. Please refer to Section 3 for the empirical determination of the window size. The position of the selected features is determined by the template matching process described in 1.1 (typically, a match is found if the NCC score is greater than 0.7) and the radial distortion is corrected.

2.5 Homography Updating and Resolution Estimation

Using the four feature point correspondences $p_i^I \leftrightarrow P_i^w$, a new homography H is determined. A reprojection error measure is defined as:

$$\varepsilon = \frac{\sum_{i=1}^{4} (p_i^I - HP_i^W)^2}{4}$$

If $\epsilon$ is smaller than a predefined threshold (a value of 5.0 has proven to be a useful threshold value), the homography is accepted and another tracking cycle can begin with the next video frame. If $\epsilon$ is greater than the threshold, it may indicate that the set of point correspondences contains a spurious value due to noise or occlusion. To handle this, the search for a fifth feature point is carried out. If one additional feature point is detected, the planar homography is computed for every subset of four points among five and the one that minimizes $\epsilon$ is chosen as the result. If a fifth feature point cannot be detected, tracking fails and the tracker reverts to the initialization mode. The fiducial marker has to be in view for the tracker to be re-initialized.

If the tracking succeeds, an estimate of the viewed resolution of the planar scene is computed as follows: two feature points whose coordinates are known in the world frame and in the image frame are chosen. We know the distance in millimeters separating the two features in the world frame and the distance in pixels separating them in the image frame. Consequently, it is easy to know how many pixels represent a centimeter in world coordinates and to deduce the resolution of the scene that the camera is currently viewing. If necessary, a different set of features corresponding to that resolution is chosen.

3. Implementation Details 3.1 Determining the Parameters

Our feature extraction technique necessitates that we set the dimensions w and h of the template as well as dimensions $w_{search}$ and $h_{search}$ of the search size once and for all for the whole process. For simplicity reasons, we declare that both windows are square, that is, w=h and $w_{search}=h_{search}$.

3.1.1 Template Size

For normalized cross correlation to be reliable, w has to be large, but this also means that template matching will be computationally expensive. The computation time needed by normalized crossed correlation has been calculated for a range of values of w. A value of 25 pixels has shown to be a good trade-off between reliability and speed for images of dimensions 3800 pixels×1920 pixels.

3.1.2 Search Area Size

Concerning the online tracking phase, the feature prediction method has a direct influence on the size of the search area. A small search area would make faster the matching process but would cause tracking to fail due to the coarse nature of the prediction method. This means that a too small value of $w_{search}$ will give a higher chance of the tracked feature not being in the search area and causing the tracker to fail. To determine $w_{search}$ empirically, tracking in real conditions was carried out for four thousand features with different combinations of prediction methods (2.3.1), (2.3.2), and (2.3.3). The error rate representing the percentage of feature points that were not detected in the search area was calculated as a function of the search area size. The results are shown in FIG. 8.

Figure 8:
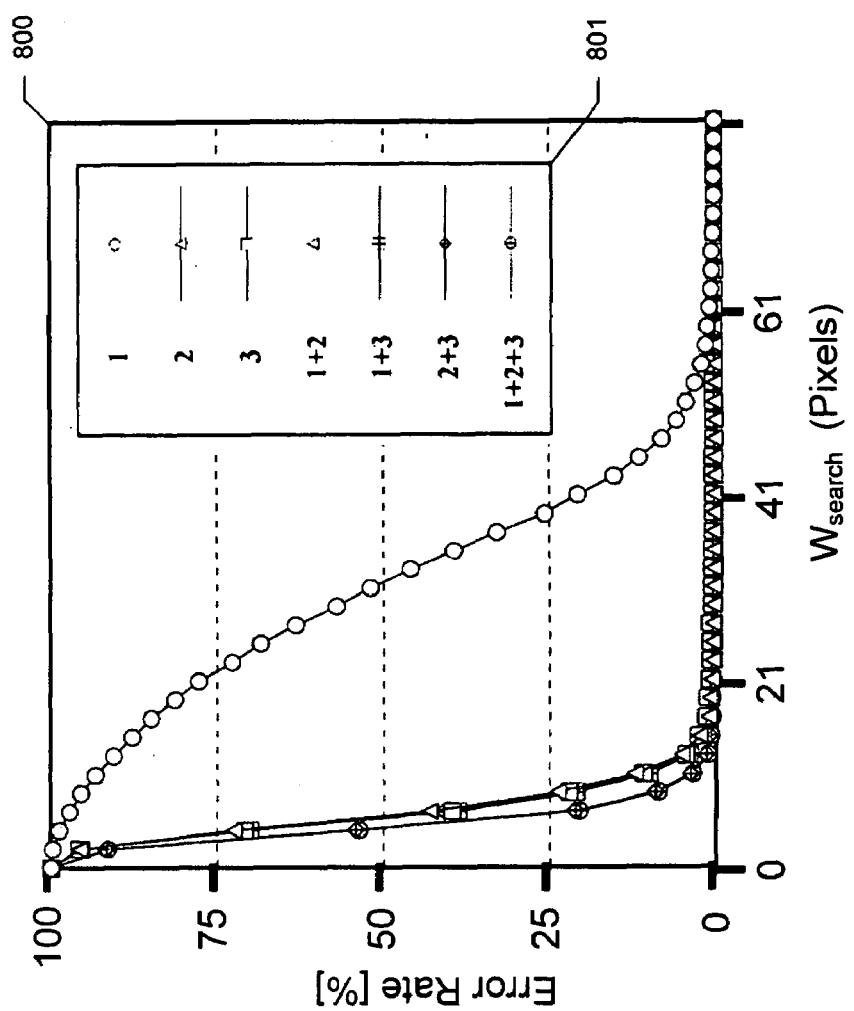
FIG. 8 is a graph showing the experimental efficacy of different combinations of these prediction methods.

FIG. 8 is a graph showing the experimental efficacy of different combinations of these prediction methods. The graph 800 is encoded using a key 801, in which the numeral 1 refers to prediction method (2.3.1), the numeral 2 refers to prediction method (2.3.2), and the numeral 3 refers to prediction method (2.3.3).

It can be seen that prediction method (2.3.1) gives poor results unless the search window size is large. Furthermore, we observe that any combination of two prediction methods or of the three together gives similar results. To choose a search area size, we look more in details in the range between 41 and 61 pixels to see what value provides an acceptable error rate for every prediction method. The results are shown in Table 1 below.

The combination of prediction methods (2.3.1) and (2.3.2) is chosen to reduce the time needed by the prediction stage of the tracker. Consequently, a search area size of 49 is selected since it is the minimum size guaranteeing that the feature points will be found in the search area.

Finally, during the online tracking, the coarse step of template matching is performed every n=3 pixels. This value allows enough speed improvement for the tracker to work in real time.

3.2 Performance Evaluation

One of the major design goals of our augmented reality system was real-time performance on a standard personal computer. The software runs under the Windows XP operating system and the camera used is an off-the-shelf USB web camera delivering 640 pixel×480 pixel video frames. The tracking system is currently implemented in C with OpenGL and VRML used to render the augmented graphics on top of the video. All tests have been run on an Intel Pentium IV 2.4 GHz processor, with a GeForce4 Ti 4600 video card.

3.2.1 Off line Feature Extraction

The off line feature extraction is the bottleneck of the whole application because of its algorithmic complexity. For small images (640 pixels×480 pixels) the processing time can be a few minutes. However, when the size of the input becomes large, as it is the case for our application (3800 pixels×1920 pixels), the time needed to generate the feature map at different resolutions is more than five hours. This remains the main drawback of the application.

3.2.2 Online Tracking

The online tracking shows promising results with a frame rate of 25 to 30 frames per second. This proves that the method is suitable for real-time purposes.

The scale invariance is tested by starting tracking with the camera far away from the scene and gradually taking it closer to the scene. The multi-resolution template scheme works well as shown in FIGS. 9A-9C.

Figure 9A:
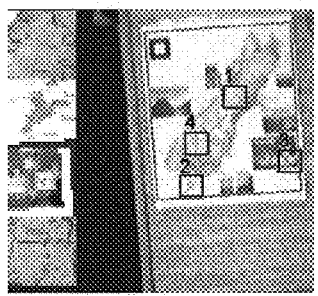
FIGS. 9A-9C are tracking diagrams showing tracking results for various resolutions in a scene.
Figure 9B:
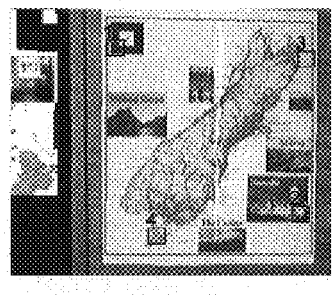
Figure 9C:
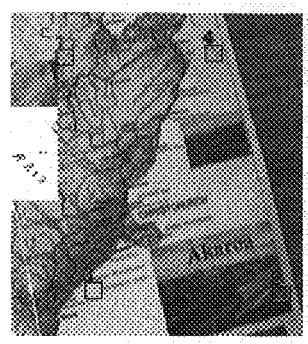

FIGS. 9A-9C are tracking diagrams showing tracking results for various resolutions in a scene. FIG. 9A shows tracking results for a low resolution, FIG. 9B for a medium resolution, and FIG. 9C for a high resolution. The numbered green squares in these figures represents the current point features tracked. A zoomed view of the templates can be seen on the left side of each figure.

Occlusion handling is then tested with a typical user's reaction: putting a hand over the scene to track. Here again, the tracker succeeds in choosing alternative feature points, thus providing continuous tracking. The results for occlusion are shown in FIGS. 10A and 10B.

Figure 10A:
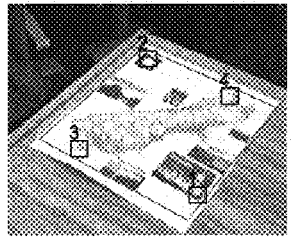
FIGS. 10A and 10B are tracking diagrams showing tracking results under an occlusion condition.
Figure 10B:
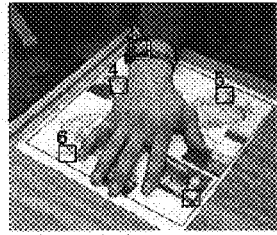

FIGS. 10A and 10B are tracking diagrams showing tracking results under an occlusion condition. FIG. 10A shows tracking results for a scene that is not occluded, while FIG. 10B shows tracking results for a similar scene that is occluded by a human hand. Because the occlusion of feature 2 shown in FIG. 10A is prevented in the scene shown in FIG. 10B by the occlusion, the facility proceeds to register a new feature in the scene of FIG. 10B, shown there as feature number 4.

Note that only the natural feature tracking mode provides any robustness to occlusion. The marker-based initialization mode of the tracker requires the marker to be completely visible. The robustness of the tracker relative to different orientations was also tested. The scene was alternatively viewed from different angles and the tracker succeeded in finding four features, even under severe rotation. An example is shown in FIGS. 11A-11D.

Figure 11A:
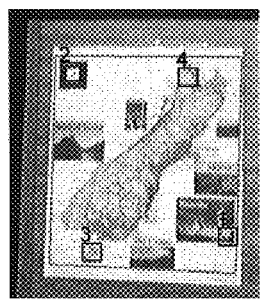
FIGS. 11A-11D are tracking diagrams showing tracking results for scenes under various degrees of rotation.
Figure 11C:
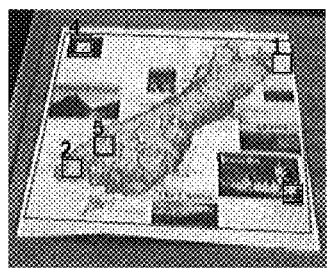
Figure 11B:
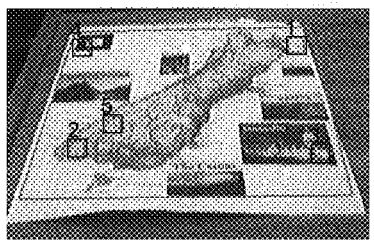
Figure 11D:
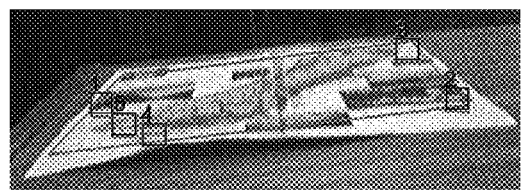

FIGS. 11A-11D are tracking diagrams showing tracking results for scenes under various degrees of rotation. FIG. 11A shows tracking results under no rotation, FIG. 11B under rotation of 45°, FIG. 11C under rotation of 60°, and FIG. 11D under rotation of 80°.

One limitation of some embodiments of the tracker is its sensitivity to rapid motion. If the camera is rotated or translated quickly, the tracker usually fails. This is due to the poor image quality delivered by a simple USB web camera. When the camera moves quickly, the frame provided by the camera is too blurred for template matching to succeed. The use of a higher quality camera with higher shutter-speed should increase considerably the robustness of the tracker to rapid image motion.

6. Additional Details

This section contains additional details about the facility and its implementation.

6.1 Tracked Images

FIGS. 12A and 12B are image diagrams showing sample images tracked by the facility. The image of FIG. 12A consists of letters and photos and has a size of about 20 cm by 28 cm. The image of FIG. 12B is an example of a color map, and is of size of about 80 cm by 104 cm.

6.2 Registration by Template Matching

6.2.1 Coordinates System

Figure 13:
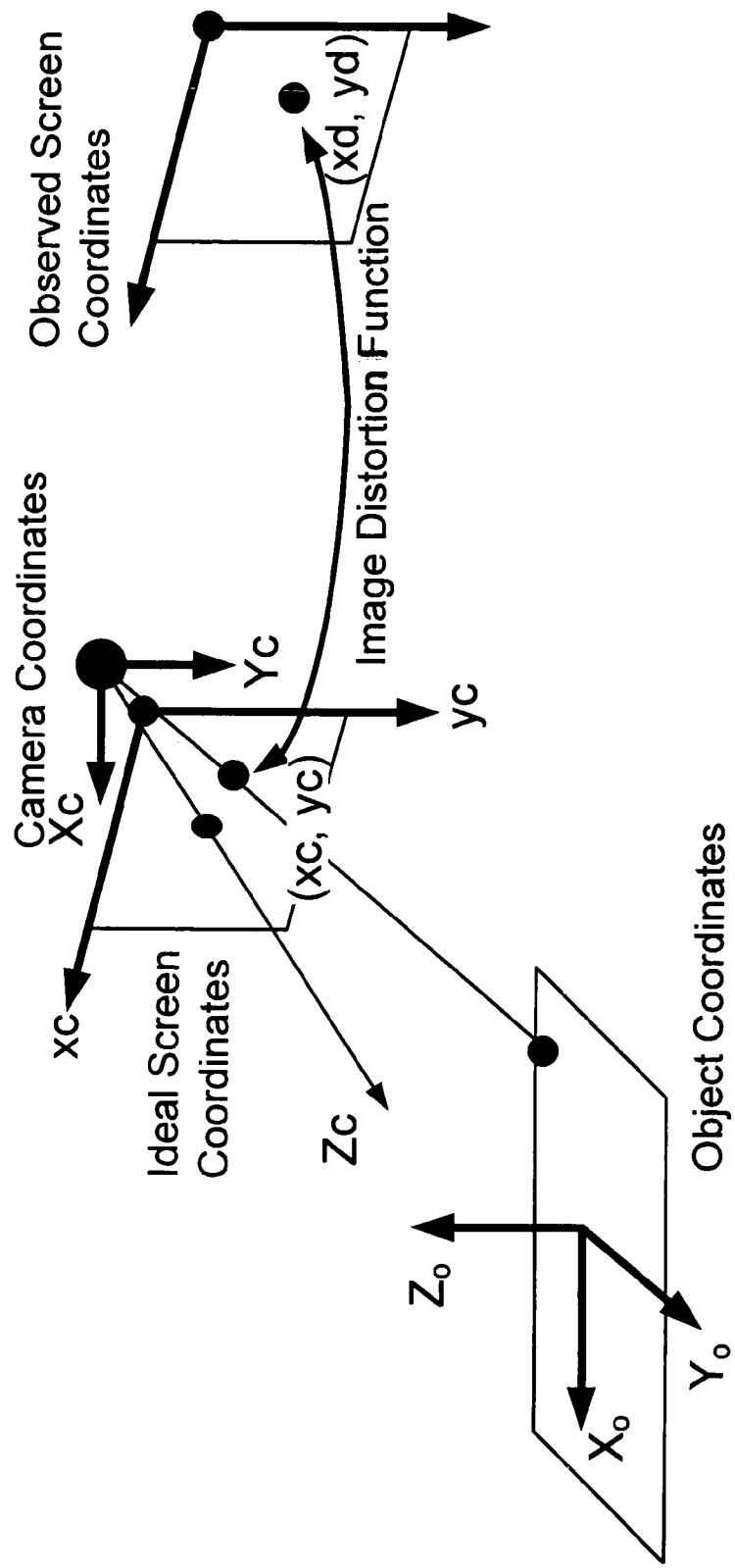
FIG. 13 is a coordinate diagram showing the coordinate system used by the facility.
Figure 16A:
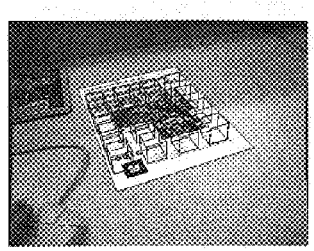
FIGS. 16A-16H are tracking diagrams showing the results of sample tracking experiments.
Figure 16B:
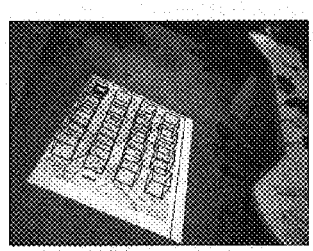
Figure 16C:
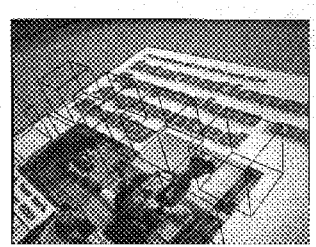
Figure 16D:
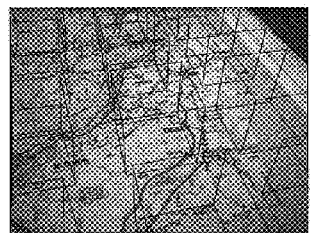
Figure 16E:
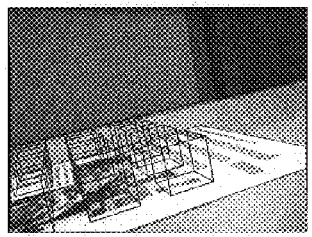
Figure 16F:
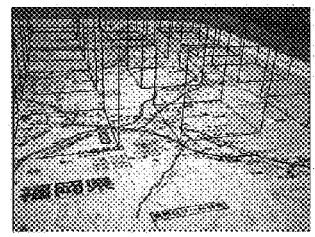
Figure 16G:
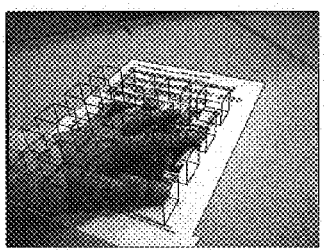
Figure 16H:
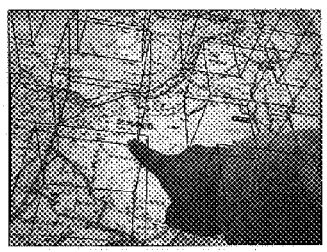
Figure 17A:
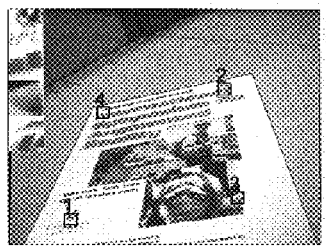
FIGS. 17A-17D show template matching results for example images.
Figure 17B:
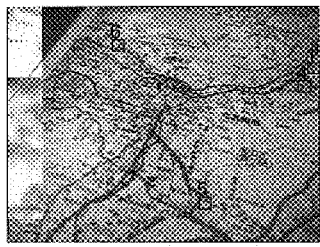
Figure 17C:
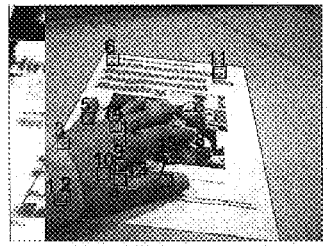
Figure 17D:
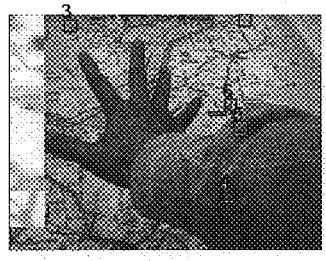

FIG. 13 is a coordinate diagram showing the coordinate system used by the facility. There is an object coordinate frame centered on the tracked object. The origin of the object coordinates, $X_o$ and $Y_o$ axes lie on the surface, while the $Z_o$ axis is perpendicular to the surface. The camera has a camera coordinate frame and there is a perspective relationship between the camera coordinates and the screen coordinates. Straight lines in the 3D environment should ideally remain straight when transformed into screen coordinates. However in practice this does not happen because of lens distortion. To compensate for this we introduce two screen coordinates; ideal screen coordinates which keep the perspective transformation with camera coordinates, and observed screen coordinates which represent the distorted image from the camera. The transformation from object coordinates to ideal screen coordinates is represented by $$h \begin{bmatrix} x_c \\ y_c \\ 1 \end{bmatrix} = \begin{bmatrix} C_{11} & C_{12} & C_{13} \\ 0 & C_{22} & C_{23} \\ 0 & 0 & 1 \end{bmatrix} \begin{bmatrix} R_{11} & R_{12} & R_{13} & T_1 \\ R_{21} & R_{22} & R_{23} & T_2 \\ R_{31} & R_{32} & R_{33} & T_3 \end{bmatrix} \begin{bmatrix} X_o \\ Y_o \\ Z_o \\ 1 \end{bmatrix} = \quad \text{(eq.6.1)}$$

-continued $$C \cdot T_{co} \begin{bmatrix} X_o \\ Y_o \\ Z_o \\ 1 \end{bmatrix}$$

where matrix C contains the intrinsic camera parameters of focal length, scale factor, optical center, aspect ratio and skew factor based on perspective projection model. Matrix $T_{co}$ represents the transformation between object coordinates to camera coordinates and consists of a translation component and a rotation component.

The point $(x_c, y_c)$ in ideal screen coordinates is transformed to the point $(x_d, y_d)$ in observed screen coordinates by the distortion function $$x=s(x_c-x_{d0}), y=s(y_c-y_{d0})$$

$$d^2=x^2+y^2$$

$$p=\{1-fd^2\}$$

$$x_d=px+x_{d0}, y_d=py+y_{d0} \quad \text{(eq. 6.2)}$$

where $(x_{d0}, y_{d0})$ is the center of distortion, s is the scale parameter and f is the distortion factor. This transformation is a non-linear function but we represent it as follows:

$$\begin{bmatrix} x_d \\ y_d \\ 1 \end{bmatrix} = F \begin{bmatrix} x_c \\ y_c \\ 1 \end{bmatrix} \quad \begin{bmatrix} x_c \\ y_c \\ 1 \end{bmatrix} = F^{-1} \begin{bmatrix} x_d \\ y_d \\ 1 \end{bmatrix} \quad \text{(eq.6.3)}$$

So the registration problem reduces to calculation of the transformation matrix $T_{co}$. We describe how to do this in the next section.

6.2.2 Pose and Position Calculation

Given that there are n feature points $(X_{oi}, Y_{oi}, Z_{oi})$ (i=0,1, n−1) in object coordinates and they are projected into $(X_{di}, Y_{di})$ (i=0,1, n−1) in observed screen coordinates, an error function is represented in ideal screen coordinates (eq.6.4).

$$err^2 = \frac{1}{n} \sum_{i=0}^{n-1} \{(x_{ci} - \tilde{x}_{ci})^2 + (y_{ci} - \tilde{y}_{ci})^2\} \quad \text{(eq.6.4)}$$

$$\begin{bmatrix} x_{ci} \\ y_{ci} \\ 1 \end{bmatrix} = F^{-1} \begin{bmatrix} x_{di} \\ y_{di} \\ 1 \end{bmatrix}, \quad h \begin{bmatrix} \tilde{x}_{ci} \\ \tilde{y}_{ci} \\ 1 \end{bmatrix} = C \cdot T_{co} \begin{bmatrix} X_{oi} \\ Y_{oi} \\ Z_{oi} \\ 1 \end{bmatrix}$$

The matrix $T_{co}$ minimizes this error function. If n is more than 3 and suitable initial values are given for $T_{co}$, this calculation is possible. We employ the functions provided by ARToolKit for this calculation. In order to set suitable initial values into $T_{co}$, the result for previous frame is used in iterative tracking phase. A black square fiducial and ARToolKit functions are used to set the initial values in initial detection phase.

To calculate subsequent values for $T_{co}$ we need to detect positions in observed screen coordinates which correspond to n feature points in object coordinates. We employ template matching for this process.

6.2.3 Feature Detection by Template Matching

Template matching can detect similar regions to the template from images. In general templates have to be prepared beforehand. However this is impossible with this kind of 3D tracking, because the image of a feature point varies by its 6 DOF movement. Therefore the templates have to be generated for each image frame. We assume that the movement of the tracked object is small between each continuous image frame. Then templates are generated from the texture image of the tracked object that is captured beforehand based on the pose and position information in previous frame. Detection of feature positions consists of the following three steps:

1) Calculation of observed screen coordinates $(x_{di}, y_{di})$ of feature points The tracked object exists in $X_0$-$Y_0$ surface of the object coordinates. So the feature points can be represented as $(X_{oi}, Y_{oi}, 0)$ (i=0,1, n−1). Given transformation matrix from the object coordinates to camera coordinates in previous frame is $T_{co}$, observed screen coordinates $(x_{di}, y_{di})$ corresponding to $(X_{oi}, Y_{oi}, 0)$ can be calculate by (eq.1) and (eq.2).

2) Generation of the template in which $(x_{di}, y_{di})$ is centered

In order to generate the template in which $(x_{di}, y_{di})$ is centered, the transformation from observed screen coordinates to $X_0$-$Y_0$ surface in the object coordinates is needed. Given $Z_0=0$, the following equation is obtained.

$$h \begin{bmatrix} x_c \\ y_c \\ 1 \end{bmatrix} = C \cdot T_{co} \begin{bmatrix} X_o \\ Y_o \\ 0 \\ 1 \end{bmatrix} = \begin{bmatrix} p_{11} & p_{12} & p_{13} \\ p_{21} & p_{22} & p_{23} \\ p_{31} & p_{32} & p_{33} \end{bmatrix} \begin{bmatrix} X_o \\ Y_o \\ 1 \end{bmatrix} = P \begin{bmatrix} X_o \\ Y_o \\ 1 \end{bmatrix} \quad \text{(eq.6.5)}$$

Therefore, $$\frac{1}{h} \begin{bmatrix} X_o \\ Y_o \\ 1 \end{bmatrix} = P^{-1} \begin{bmatrix} x_c \\ y_c \\ 1 \end{bmatrix} = P^{-1} \cdot F^{-1} \begin{bmatrix} x_d \\ y_d \\ 1 \end{bmatrix} \quad \text{(eq.6.6)}$$

By using this equation, object coordinates for every template pixels are calculated and color values can be substituted in the template from the texture image of the tracked object.

Template Matching

We employ normalized correlation for the template matching.

$$s = \frac{\sum_{i=1}^{N}(x_i - \tilde{x}) \cdot (y_i - \tilde{y})}{\sqrt{\sum_{i=1}^{N}(x_i - \tilde{x})^2} \sqrt{\sum_{j=1}^{N}(y_j - \tilde{y})^2}} \quad \text{(eq.6.7)}$$

where $x_i$ is a pixel value, $\tilde{x}_i$ is the mean of pixel values, $y_i$ is a template value and $\tilde{y}_i$ is the mean of template values. The calculated value is between −1.0 and 1.0. The position where the biggest value is found matches the corresponding position $(x_{di}, y_{di})$ in observed screen coordinates to feature position $(X_{oi}, Y_{oi}, 0)$ in object coordinates.

If at least three corresponding positions can be obtained, $T_{co}$ can be found for the current image frame using the calculation in previous section.

6.3 Improvements for Performance and Accuracy

6.3.1 Multi Scale Templates and Defocusing

Templates can be generated by using (eq.6.6), however if the resolution of the texture image is quite different from the resolution of generated templates, the expected templates cannot be found because of the resampling problem. If an interpolation technique is used in resampling, it could be avoided. But it requires much calculation cost. To overcome this some textured images with several resolutions need to be prepared beforehand.

We also assume that the camera does not have automatic focus control and that input images are captured with blur in certain distance between the camera and tracked objects. To compensate for this we defocus some texture images by adopting an averaging filter of 3×3 mask.

6.3.2 Feature Selection

Feature points in texture images are registered with our software beforehand so they can be used for template matching. However suitable feature points for template matching depend on the resolution. For example, when the camera is near to the tracked object, the resolution of observed image is high and small letters in the image can be used as feature points. On the other hand, when the camera is far from the tracked object, the resolution of observed image is low and small letters cannot be resolved. To compensate for this suitable feature points are independently registered for different resolutions of the texture image.

As many feature points as possible are registered, and the best of these are dynamically selected in the tracking phase. Because we don't use special hardware for the template matching, the selection of the least number and optimal locations of feature points is desired in order to reduce the calculation cost as much as possible. In addition, the order of selection of feature points is important and is done iteratively with the tracking of each feature point.

We employ a heuristic feature selection method as follows. First of all, the most important feature selection policy is that four feature points are detected from images. If this is impossible, detection of three feature points is needed. If fewer than three feature points are detected, then tracking fails. When a feature point is selected, template matching is done for the selected feature. If the template matching succeeds, in other words the maximal value of normalized correlation is greater than 0.7, the feature point are stored and selection of next feature point is continued. If the template matching fails, the feature point is rejected and selection of an alternative feature point is continued. The conditions used by this selection policy are as follows:

1) Common condition that is not relative to selection order
   1.1—The position of the feature point has to be within the image window when its 3D position is projected into the observed screen coordinates by using the $T_{co}$ matrix obtained from the previous frame.
   1.2—The resolution of the feature point is satisfied with the condition pre-defined for each feature when it is projected into the observed screen coordinates.
2) Selection of the first feature point
   The feature position is the farthest from image center.
3) Selection of the second feature point
   The feature position is the farthest from the first feature point.
4) Selection of the third feature point
   The area of the triangle that is made with the first and second feature points is maximum.
5) Selection of the fourth feature point
   The area of the rectangle that is made with the first, second and third feature points is maximum.
6) Selection of the fifth feature point
   The feature is selected in registered order.

When template matching succeeds for four feature points, the transformation matrix $T_{co}$ is calculated from them based on (eq. 6.4). If the error is less than a certain value (5.0 in experiments), the object tracking succeeds. If not, missed detections might be included and the detection of a fifth feature point is carried out. If one is found, the transformation matrices $T_{co}$ are calculated for all combinations of four feature points in the set of five points. Then the transformation matrix with minimum error is picked up as a result. If the detection of a fifth feature point fails, transformation matrices $T_{co}$ are calculated for all combinations of three feature points in the set of four points. Then the transformation matrix with minimum error is picked up as a result. If the minimum error value is greater than a threshold, the object tracking fails.

6.3.3 Improvement of Performance on Template Matching

Normalized correlation has a high calculation cost while it detects matching point well. Our template size is 24×12 pixels for a 640×240 image. Images of 640×480 are input but field sequential images are used for template matching. To further improve performance, template matching is done for gray-scale pixel values that are calculated by averaging color pixels. At the moment, the dimension of matching data is 24×12×1=288 and its calculation cost is still high.

To reduce the calculation cost, we employ two steps template matching. First of all, a coarse search is carried out. In scanning on the search area, template matching is done once for every 3 pixels in the x direction and the positions of best three results are stored. Also (eq. 6.9) is used for this template matching.

$$e = \sum_{j=0}^{11} \sum_{i=0}^{11} |(I(2i, j) - \bar{I}) - (T(2i, j) - \bar{T})| \quad \text{(eq.6.9)}$$

where I(i,j) is a pixel value at position (i, j) in the region on which template overlaps, $\bar{I}$ is an average pixel values in the region in which the template overlaps, T(i,j) is a pixel value at position (i, j) in the template and $\bar{T}$ is an average pixel value in the template. As mentioned before, the template size is 24×12 pixels. However this calculation uses one pixel in every two pixels so the calculation cost is reduced.

Next, a fine search is carried out. A normalized correlation with a 24×12 template size is used based on (eq. 6.7) in regions around the previously obtained three positions. Then the position with highest correlation value is found as the result.

In order for this template matching to work well, matching results in the region around the correct position have to keep a high similarity so that they are included in the best three results in the coarse search. Defocusing the texture images aids this 2 step matching process as well.

6.4 Off line Automatic Feature Detection

Many suitable feature points have to be registered in images of all resolutions so that the template matching described in section 3 works well. There are two conditions for suitable feature points.

1) There are no similar regions within the search size of template matching.

2) Similarity within three pixels from the feature point is high.

We have developed a method for automatic detection of the best feature points. Suitability as a feature point is examined at every position for texture images of all resolutions. For each point in the texture image, the region of which the point is center is extracted as a template and the maximum value of the normalized correlation is calculated from a search area of 49×49 pixels, excluding the center 5×5 pixel region. This value is calculated at every position in a texture image.

FIGS. 14A and 14B are diagrams showing preliminary feature point extraction results. FIG. 14A shows preliminary feature point extraction results for the image of FIG. 12A while FIG. 14B shows preliminary feature point extraction results for the image of FIG. 12B. Bright pixels in these images means little correlation value, that is, bright position are suitable for condition 1 as a feature point. The square marker regions in the images are also omitted from this calculation.

Next, normalized correlation is carried out for the 5×5 region, excluding the center position. If the minimum value is greater than 0.6 and the maximum value less than 1.0, then the position is registered as a feature point. However if its template region has overlaps with the template regions of pre-registered feature points, it is cancelled. FIGS. 15A and 15B are diagrams showing preliminary feature point extraction results. FIG. 15A shows preliminary feature point extraction results for the image of FIG. 12A while FIG. 15B shows preliminary feature point extraction results for the image of FIG. 12B. Each figure shows feature points extracted at three different levels of resolutions: feature points identified by red boxes at a high level of resolution, feature points identified by green boxes at a medium level of resolution, and feature points identified by blue boxes at a low level of resolution.

6.5 Experiments

Experiments were done for texture images in FIG. 1. We used a PC with an Intel Pentium4 2.0 GHz, Linux OS, an analog video capture card and a GeForce3 graphics card. A camera was attached on a HMD and its shutter speed was 1/250 sec. 640×480 images were captured and the tracking program was able to work accurately at about 30 frames per seconds. While tracking succeeds, 16 wire-frame cubes are overlaid on the tracked objects.

FIGS. 16A-16H are tracking diagrams showing the results of sample tracking experiments. We can see virtual objects are suitably overlaid on the tracked objects in some conditions.

FIGS. 17A-17D show template matching results for example images. The rectangles arrayed along the left edge of each figure show the feature templates generated by the facility for the matched features. Green rectangle regions in images are accepted matching regions and yellow rectangle regions are rejected regions. We can see template matching is attempted until 4 matching regions are found. So registration works well even when textures are occluded by a hand.

Tracking sometimes failed when a tracked object rotates quickly because template matching is robust for translation but not robust for rotation of the tracked regions. Another problem was pose and position calculation from 3 feature points. When 3 feature points are almost in a straight line, the registration was bad and it caused tracking to fail in next frame. So the condition to select 3 feature points in the set of 4 points has to be considered.

It will be appreciated by those skilled in the art that the above-described facility may be straightforwardly adapted or extended in various ways. While the foregoing description makes reference to preferred embodiments, the scope of the invention is defined solely by the claims that follow and the elements recited therein.

We claim:

1. A method in a computing system for tracking movement of a surface having an arbitrary appearance relative to a camera, comprising:
    capturing an image of the surface using the camera;
    analyzing the captured image of the surface to identify visual features present in the captured image;
    from the identified visual features, selecting a plurality of visual features for use in tracking the movement of the surface, wherein the selection of visual features is performed based upon a comparison of levels of contrast provided by each of the identified features;
    receiving a sequence of images captured by the camera, at least some of which constitute a view of at least a portion of the surface;
    for each image of the sequence:
        identifying 2-dimensional positions at which the selected features occur in the image; and
        based upon the 2-dimensional positions at which the selected features are identified in the image, determining 3-dimensional location and orientation of the surface in the image of the sequence with respect to the camera;
    using the determined location and orientation of the surface to introduce a supplemental image into the images of the sequence at a size, location, and orientation that are relative to those of the surface to obtain an augmented sequence of images; and
    displaying the augmented sequence of images using a computer display.

2. The method of claim 1 wherein the identification of the 2-dimensional positions at which the selected features occur in the image is predicated on an assumption that the selected features appear as coplanar in the image.

3. The method of claim 1 wherein the surface is a 2-dimensional surface.

4. The method of claim 1 wherein the surface is a flat surface.

5. The method of claim 1 wherein the surface is an irregular body that appears flat when observed at a distance.

6. The method of claim 1, further comprising using the determined location and orientation of the surface to superimpose a view of a 3-dimensional object over the surface.

7. A method in a computing system for tracking movement of a surface having an arbitrary appearance relative to a camera, comprising:
    capturing an image of the surface using the camera;
    analyzing the captured image of the surface to identify visual features present in the captured image;
    from the identified visual features, selecting a plurality of visual features for use in tracking the movement of the surface, wherein the selection of visual features is performed based upon a comparison of levels of uniqueness of each of the identified features;
    receiving a sequence of images captured by the camera, at least some of which constitute a view of at least a portion of the surface;
    for each image of the sequence:
        identifying 2-dimensional positions at which the selected features occur in the image; and based upon the 2-dimensional positions at which the selected features are identified in the image, determining 3-dimensional location and orientation of the surface in the image of the sequence with respect to the camera;

using the determined location and orientation of the surface to introduce a supplemental image into the images of the sequence at a size, location, and orientation that are relative to those of the surface to obtain an augmented sequence of images; and displaying the augmented sequence of images using a computer display.

8. The method of claim 7, further comprising, for each image of the sequence:

based upon the 2-dimensional positions at which the features are identified in one or more prior images of the sequence, predicting 2-dimensional positions at which the features will occur in the current image; and establishing search zones about the predicted positions, and wherein identifying the 2-dimensional positions at which the selected features occur in the image comprises searching the established search zones for the selected features.

9. The method of claim 7 wherein the surface, in addition to having an arbitrary appearance, is modified to contain one or more fiducial markers, the method further comprising, in a first image of the sequence, identifying and analyzing a portion of the image corresponding to the fiducial markers for determining the 3-dimensional location and orientation of the surface in the image, and wherein the determining the 3-dimensional location and orientation of the surface in the first image of the sequence is used to identify the 2-dimensional positions at which the selected features occur in the first image of the sequence.

10. The method of claim 9 wherein each fiducial marker comprises a unique distinguishing pattern.

11. The method of claim 9 wherein each fiducial marker is square-shaped.

12. The method of claim 7 wherein the 3-dimensional location and orientation of the surface in the image of the sequence is determined without use of explicit fiducial markers.

13. The method of claim 7 further comprising capturing the sequence of images using the camera, and wherein the determination is made in real-time with respect to the capture.

14. The method of claim 7 wherein the movement of the surface is tracked within an environment, and wherein, between two successive images of the sequence, the camera moves relative to the environment.

15. The method of claim 7 wherein the movement of the surface is tracked within an environment, and wherein, between two successive images of the sequence, the surface moves relative to the environment.

16. A method in a computing system for tracking movement of a surface having an arbitrary appearance relative to a camera, comprising:

capturing an image of the surface using the camera;

analyzing the captured image of the surface to identify visual features present in the captured image;

from the identified visual features, selecting a plurality of visual features for use in tracking the movement of the surface, wherein the selection of visual features is performed based upon a comparison of levels of contrast provided by each of the identified features;

receiving a sequence of images captured by the camera, at least some of which constitute a view of at least a portion of the surface;

for each image of the sequence:

identifying 2-dimensional positions at which the selected features occur in the image; and based upon the 2-dimensional positions at which the selected features are identified in the image, determining 3-dimensional location and orientation of the surface in the image of the sequence with respect to the camera, wherein the selection of visual features includes selecting visual features in at least two different size ranges, the method further comprising selecting one of the size ranges based upon a measure of a distance to the surface's present location, and wherein the selected features in the selected size range are used to determine the location and the orientation of the surface;

using the determined location and orientation of the surface to introduce a supplemental image into the images of the sequence at a size, location, and orientation that are relative to those of the surface to obtain an augmented sequence of images; and displaying the augmented sequence of images using a computer display.

17. The method of claim 16 wherein the selection of visual features is performed based upon a comparison of levels of accuracy with which they can be used to determine the location and the orientation of the surface.

18. A method in a computing system for determining 3-dimensional location and orientation of a subject surface in a distinguished perspective image of the subject surface, the subject surface having innate visual features, comprising:

identifying a plurality of subsets of innate visual features of the subject surface, each subset containing visual features of a different general size;

based on an earlier-determined 3-dimensional location of the subject surface, selecting one subset of visual features;

using locations of the visual features of the selected subset in a perspective image of the subject surface that precedes the distinguished perspective image in time, and identifying search zones in the distinguished perspective image;

searching the identified search zones for the visual features of the selected subset to determine 2-dimensional positions at which the visual features of the selected subset occur;

based on the determined 2-dimensional positions, determining the 3-dimensional location and orientation of a subject surface in the distinguished perspective image;

using the determined location and orientation of the surface to introduce a supplemental image into the images of the sequence at a size, location, and orientation that are relative to those of the surface to obtain an augmented sequence of images; and displaying the augmented sequence of images using a computer display.

19. The method of claim 18 wherein the selected innate visual features of the subject surface number at least four.

20. The method of claim 18 wherein the determination of the 2-dimensional locations at which the selected visual features occur is predicated on an assumption that the selected visual features appear as coplanar in the image.

21. A computer-readable storage medium comprising computer executable instructions which when executed on a computing system cause the computing system to perform a method for tracking movement of a surface having an arbitrary appearance relative to a camera, the method comprising:

capturing an image of the surface using the camera;

analyzing the captured image of the surface to identify
visual features present in the captured image;
from the identified visual features, selecting a plurality of
visual features for use in tracking the movement of the
surface, wherein the selection of visual features is
performed based upon a comparison of levels of contrast provided by each of the identified features;
receiving a sequence of images captured by the camera, at
least some of which constitute a view of at least a
portion of the surface;
for each image of the sequence:
identifying 2-dimensional positions at which the
selected features occur in the image; and
based upon the 2-dimensional positions at which the
selected features are identified in the image, determining 3-dimensional location and orientation of the
surface in the image of the sequence with respect to
the camera;
using the determined location and orientation of the
surface to introduce a supplemental image into the
images of the sequence at a size, location, and orientation that are relative to those of the surface to obtain
an augmented sequence of images; and
displaying the augmented sequence of images using a
computer display.

22. A computer-readable storage medium comprising
computer executable instructions which when executed on a
computing system cause the computing system to perform a
method for tracking movement of a surface having an
arbitrary appearance relative to a camera, the method comprising:
capturing an image of the surface using the camera;
analyzing the captured image of the surface to identify
visual features present in the captured image;
from the identified visual features, selecting a plurality of
visual features for use in tracking the movement of the
surface, wherein the selection of visual features is
performed based upon a comparison of levels of
uniqueness of each of the identified features;
receiving a sequence of images captured by the camera, at
least some of which constitute a view of at least a
portion of the surface;
for each image of the sequence:
identifying 2-dimensional positions at which the
selected features occur in the image; and
based upon the 2-dimensional positions at which the
selected features are identified in the image, determining 3-dimensional location and orientation of the
surface in the image of the sequence with respect to
the camera;
using the determined location and orientation of the
surface to introduce a supplemental image into the
images of the sequence at a size, location, and orientation that are relative to those of the surface to obtain
an augmented sequence of images; and
displaying the augmented sequence of images using a
computer display.

23. A computer-readable storage medium comprising
computer executable instructions which when executed on a
computing system cause the computing system to perform a
method for tracking movement of a surface having an
arbitrary appearance relative to a camera, the method comprising:
capturing an image of the surface using the camera;
analyzing the captured image of the surface to identify
visual features present in the captured image;
from the identified visual features, selecting a plurality of
visual features for use in tracking the movement of the
surface, wherein the selection of visual features is
performed based upon a comparison of levels of contrast provided by each of the identified features;
receiving a sequence of images captured by the camera, at
least some of which constitute a view of at least a
portion of the surface;
for each image of the sequence:
identifying 2-dimensional positions at which the
selected features occur in the image; and
based upon the 2-dimensional positions at which the
selected features are identified in the image, determining 3-dimensional location and orientation of the
surface in the image of the sequence with respect to
the camera,
wherein the selection of visual features includes selecting visual features in at least two different size
ranges, the method further comprising selecting one
of the size ranges based upon a measure of a distance
to the surface's present location, and
wherein the selected features in the selected size range
are used to determine the location and the orientation
of the surface;
using the determined location and orientation of the
surface to introduce a supplemental image into the
images of the sequence at a size, location, and orientation that are relative to those of the surface to obtain
an augmented sequence of images; and
displaying the augmented sequence of images using a
computer display.

24. A computer-readable storage medium comprising
computer executable instructions which when executed on a
computing system cause the computing system to perform a
method for determining 3-dimensional location and orientation of a subject surface in a distinguished perspective
image of the subject surface, the subject surface having
innate visual features, comprising:
identifying a plurality of subsets of innate visual features
of the subject surface, each subset containing visual
features of a different general size;
based on an earlier-determined 3-dimensional location of
the subject surface, selecting one subset of visual
features;
using locations of the visual features of the selected subset
in a perspective image of the subject surface that
precedes the distinguished perspective image in time,
and identifying search zones in the distinguished perspective image;
searching the identified search zones for the visual features of the selected subset to determine 2-dimensional
positions at which the visual features of the selected
subset occur;
based on the determined 2-dimensional positions, determining the 3-dimensional location and orientation of a
subject surface in the distinguished perspective image;
using the determined location and orientation of the
surface to introduce a supplemental image into the
images of the sequence at a size, location, and orientation that are relative to those of the surface to obtain
an augmented sequence of images; and
displaying the augmented sequence of images using a
computer display.

\* \* \* \* \*

UNITED STATES PATENT AND TRADEMARK OFFICE
CERTIFICATE OF CORRECTION

PATENT NO. : 7,343,278 B2
APPLICATION NO. : 10/692020
DATED : March 11, 2008
INVENTOR(S) : Billinghurst et al.

It is certified that error appears in the above-identified patent and that said Letters Patent is hereby corrected as shown below:

On Page 2, item (56), under "Other Publications", in column 2, line 8, delete "Paddie" and insert -- Paddle --, therefor.

In column 4, line 4, delete "nomography" and insert -- homography --, therefor.

In column 4, line 42, delete "nomography" and insert -- homography --, therefor.

In column 5, line 44, after "as W" insert -- . --.

In column 9, line 36 (Consider Equation), delete " $\hat{p}_i^i$ " and insert -- $\hat{p}_i^k$ --, therefor.

In column 10, line 9, delete "nomography" and insert -- homography --, therefor.

In column 16, line 40 (Consider Equation), After "|(" delete "l" and insert -- I --, therefor.

Signed and Sealed this

Twenty-sixth Day of August, 2008

JON W. DUDAS
*Director of the United States Patent and Trademark Office*